United States Patent [19]
Lorch

[11] 3,805,335
[45] Apr. 23, 1974

[54] UNIVERSAL INTERCONNECTING LINKAGE FOR ASSEMBLING MOBILES AND THE LIKE

[76] Inventor: Leonard G. Lorch, 115 Lafayette Pl., Woodmere, N.Y. 11598

[22] Filed: May 29, 1973

[21] Appl. No.: 364,617

[52] U.S. Cl. ................................. 24/73 R, 40/218
[51] Int. Cl. ........................ A44b 21/00, G09f 17/00
[58] Field of Search .............. 160/345; 40/214, 218; 24/208 A, 73 PF, 73 ES, 73 CP, 73 CS, 73 CF

[56] References Cited
UNITED STATES PATENTS

| | | | |
|---|---|---|---|
| 494,825 | 4/1893 | Spicer | 24/73 ES X |
| 701,896 | 6/1902 | Kinnear et al. | 24/73 ES UX |
| 1,945,785 | 2/1934 | Neal | 40/214 |
| 3,477,161 | 11/1969 | Drexler | 40/218 |
| 3,522,621 | 8/1970 | Ford et al. | 160/345 X |
| 3,561,074 | 2/1971 | Mosher et al. | 24/208 A |
| 3,616,486 | 11/1971 | Ford et al. | 160/345 X |

*Primary Examiner*—Donald A. Griffin
*Attorney, Agent, or Firm*—Charles E. Temko

[57] ABSTRACT

An interconnecting linkage for assembling mobiles and similar structures in which the component parts are provided with through openings adjacent peripheral edges thereof, the openings being engaged by interconnecting means to allow relative movement between the parts. The linkage includes a flexible cord, and a plurality of synthetic resinous plug-like elements molded thereupon at periodic intervals. For convenience in manufacture, the linkage may be manufactured as a continuous length, to be severed at indicated intervals as required before use. The plug-like elements each include a pair of juxtaposed enlargements on a shaft defining a portion of reduced diameter therebetween which is positioned within an opening in a mobile part to be resiliently maintained therein, the cord passing through one of the enlargements to position the same adjacent the plane of the engaged parts. Manually engageable means interconnects with the cord engaging enlargement to facilitate the positioning of the plug-like element within an engaged opening.

8 Claims, 7 Drawing Figures

PATENTED APR 23 1974 3,805,335

FIG. 5
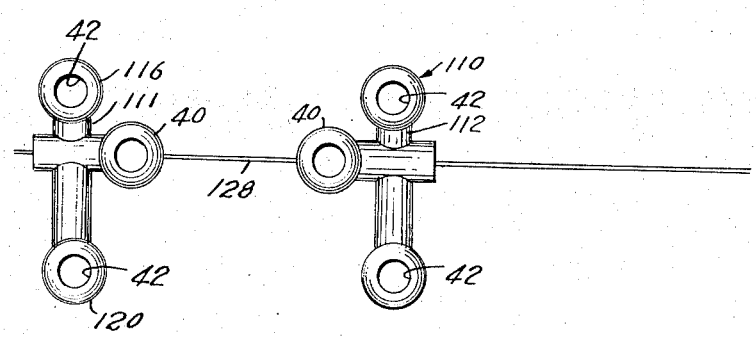
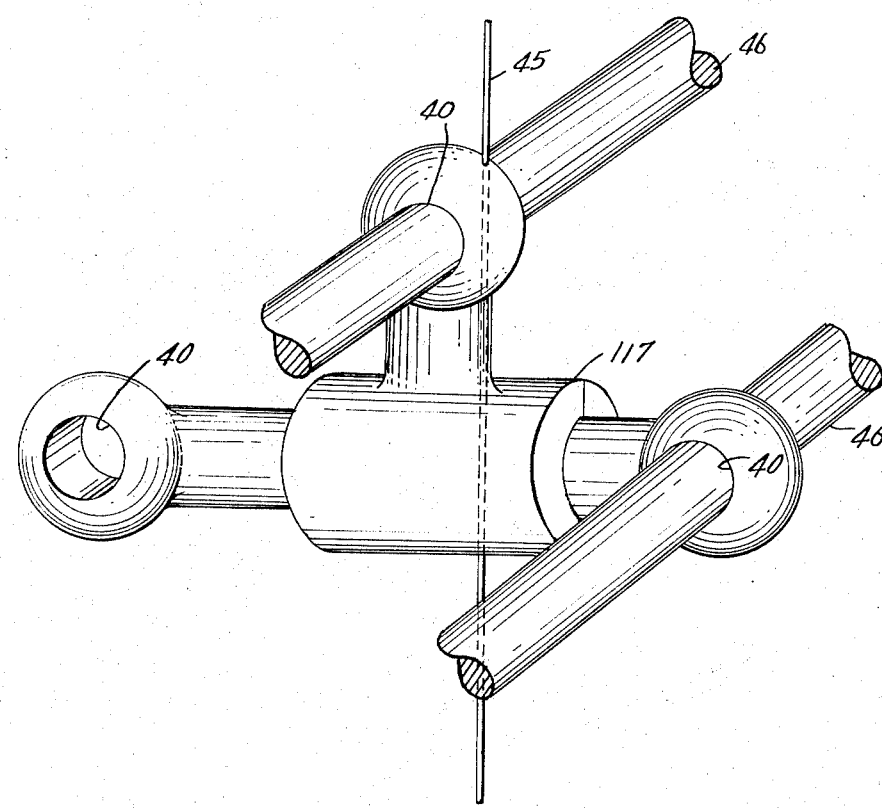
FIG. 7
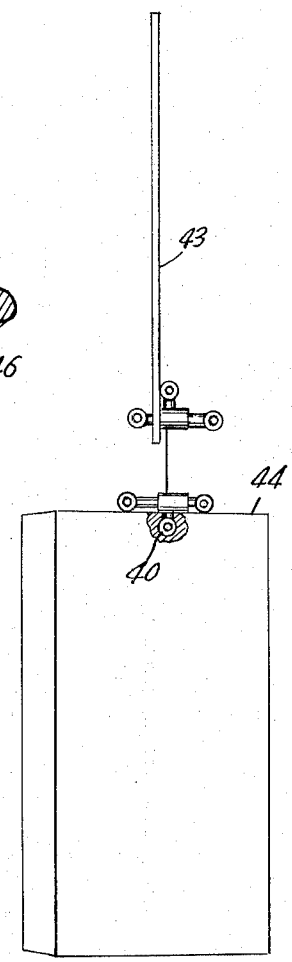
FIG. 6

UNIVERSAL INTERCONNECTING LINKAGE FOR ASSEMBLING MOBILES AND THE LIKE

BACKGROUND OF THE INVENTION

This invention relates generally to the field of interconnecting devices, and more particularly to an improved linkage suited for the interconnection of planar-configured mobiles, for example of the type disclosed in my prior U.S. Pat. No. 3,645,026, granted Feb. 29, 1972, or any other kinetic structure containing rods or three dimensional solid objects.

Prior art interconnecting linkages are legendary in number, and for the most part are designed and fabricated to serve a particular interconnecting function. Such devices include metallic staples, and bifurcated brads, for example. A device in common use in the interconnection of a plurality of pages is a short length of elastic cord having a metallic enlargement clamped thereon at each end thereof. The enlargement is threaded through openings in the paper, subsequently turned at right angles, and thereafter engages the sides of the openings in the pages, being held in engagement by the contraction of the elastic cord. It is also known in the art to provide various plug and socket interconnections forming a looped linkage suitable for attaching indicia bearing tags to garments and the like.

BRIEF DESCRIPTION OF THE PRESENT INVENTION

Briefly stated, the invention contemplates the provision of a length of cord of either textile or monofilament onto which a plurality of plug-like enlargements are integrally molded. Each such element is of generally elongated configuration, including a shaft having at least two enlargements thereon, one enlargement being at one end of the shaft. A second enlargement is spaced therefrom along said shaft to define an annular groove, the cord passing through the shaft in the area of the second enlargement. Both enlargements are slightly greater in size than the unstressed diameter of the opening in the mobile member being interconnected. The remaining portion of the shaft extends axially away from the second enlargement to form a manually engageable handle. The cord may be of any required length, and mounts a second plug-like element at an opposite end of the cord engaging a second interconnected piece.

BRIEF DESCRIPTION OF THE DRAWING

In the drawing, to which reference will be made in the specification, similar reference characters have been employed to designate corresponding parts throughout the several views.

FIG. 5 is a view in elevation of a second embodiment of the invention.

FIG. 6 is a perspective view of a modified form of the second embodiment showing the same in installed condition upon a mobile.

FIG. 7 is a fragmentary view in perspective of the modified form of the second embodiment showing a different installation.

DETAILED DESCRIPTION OF THE DISCLOSED EMBODIMENTS

Figure 2:
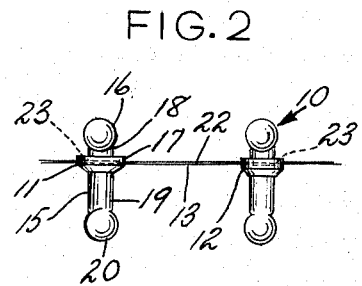
FIG. 2 is a view in perspective of a relatively short linkage.

In accordance with the first embodiment of the invention, the device, generally indicated by reference character 10 (FIG. 2) comprises broadly first and second plug-like elements 11 and 12, respectively, and an interconnecting length of cord 13.

The elements 11 and 12 are substantially identical, each being preferably formed of molded synthetic resinous material, and including an elongated shaft 15 having a first end enlargement 16 thereon. A medially positioned enlargement 17 is spaced a short distance from the enlargement 16, to define an annular groove or interstices 18 therebetween. Extending axially from the enlargement 17 is a longer portion of the shaft 19 terminating at 20 in a third enlargement.

Figure 4:
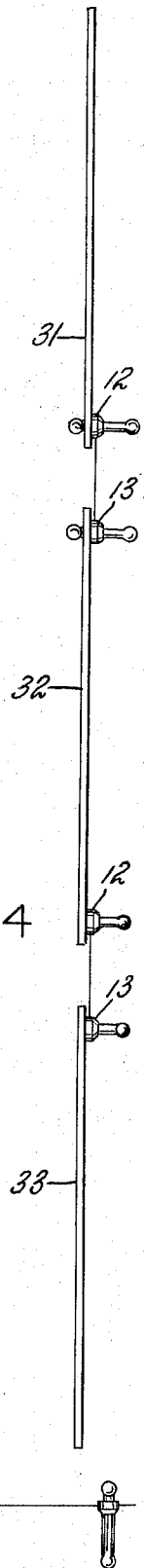
FIG. 4 is a view in elevation as seen from the lefthand portion of FIG. 1.
Figure 3:
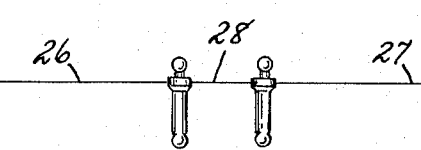
FIG. 3 is a view in perspective of a continuous length of linkage prior to severance into individual linkages.

The cord 13, as has been mentioned, may be of either textile or monofilament material, or, where greater strength is required, it may be of metallic wire, either monofilament or braided. Braided nylon cord is particularly flexible and suitable. A medial portion 22 terminates in end portions disposed within bores 23 extending through the elongated shafts 15 of each of the elements 11 and 12. This is most conveniently accomplished by insert injection molding the elements 11 and 12 directly upon the cord 15, thereby eliminating the need for a separate attaching function. Referring to FIG. 4, this may be most conveniently done by molding the elements at predetermined intervals upon a continuous length of cord to form a plurality of links 26 and 27 interconnected preferably by a short severing area 28, thus permitting the user to cut the links apart as required, as well as indicating to the user the area where to stop and cut the cord.

Figure 1:
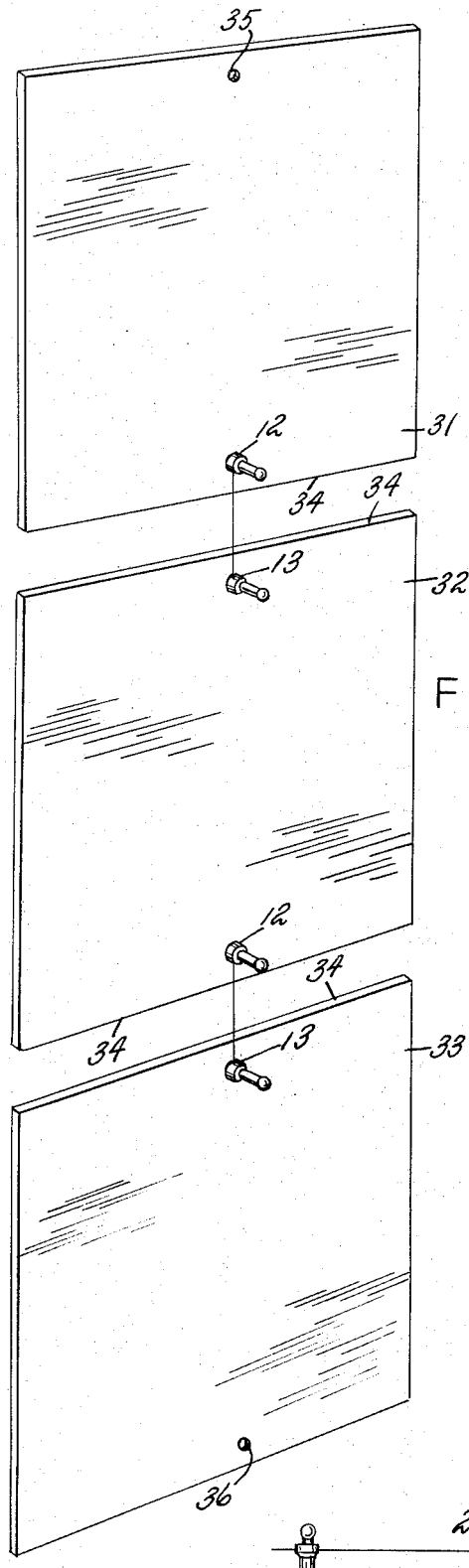
FIG. 1 is a view in perspective of a mobile, interconnected by linkage means embodying the invention.

Referring to FIG. 1, a typical mobile is illustrated, including first, second and third mobile members 31, 32 and 33, respectively, each having peripheral edges 34 and first and second openings 35 and 36 adjacent the peripheral edge. The diameter of the opening, in unstressed condition corresponds to that of the groove or interstice 18 in each of the elements 11 and 12. Interconnection of the members 31–33 is accomplished by grasping the portions 19 and 20 of an element 11–12 and inserting the opposite end into the opening, stressing the material surrounding the opening, to permit it to contract within the groove or interstice 18. This engagement is repeated at the opposite end of the cord 13 to interconnect the second member to the linkage. As best seen in FIG. 4, when the mobile is suspended the cords will lie in substantially vertical planes adjacent and parallel to the planes of the mobile members themselves, so as to be as unobtrusive as possible. To this end, the elements 11 and 12 are preferably molded from colorless material, and the cord is preferably white or colorless.

Turning now to the second embodiment of the invention, parts corresponding to those of the first embodiment have been designated by similar reference characters with the additional prefix "1."

As seen in FIG. 5, the second embodiment differs from the first embodiment in the provision of an additional enlargement 40 extending laterally from the principal axis of the plug-like elements 111 and 112.

They are positioned to lie on the ends of the short severing area 128, and serve to indicate where severing should occur. A plurality of parallel laterally extending bores 42 are disposed in the enlargements 116 and 120 as well as the enlargement 40 to permit engagement by wires or other interconnecting means used in the interconnection of mobiles. FIG. 6 illustrates one mode of interconnection between a planar piece 43 and a rectangular solid 44, the additional enlargement 40 allowing greater flexibility than is possible in the case of the first embodiment. As seen in FIG. 7, the modified form of the second embodiment calls for the displacement of the cord 45 to one side of the bore in the enlargement 40 to permit insertion of wires 46 without interference. It will be observed that all of the bores have a principal axis normal to a mold parting line to facilitate manufacture of each of the plug-like elements.

I wish it to be understood that I do not consider the invention limited to the precise details of structure shown and set forth in this specification, for obvious modifications will occur to those skilled in the art to which the invention pertains.

I claim:

1. An elongated linkage for use in interconnecting adjacent components of a mobile and similar devices comprising: first and second plug-like elements interconnected by a flexible cord at each end thereof, said plug-like elements including a shaft having a principal axis, a first enlargement at one end thereof, a second enlargement on said shaft in spaced relation to said first enlargement to define an annular groove therebetween, said cord extending through said shaft in the area of said second enlargement, said shaft extending axially from said second enlargement to a second end thereof to form a gripping means.

2. Structure in accordance with claim 1, further characterized in said first and second elements being molded from synthetic resinous material directly upon said cord.

3. Structure in accordance with claim 1, said shaft having an enlargement on said second end thereof.

4. Structure in accordance with claim 3, there being through openings in each of said first and third enlargement.

5. Structure in accordance with claim 3, including a fourth enlargement extending laterally from said second enlargement.

6. Structure in accordance with claim 5, in combination with a pair of mobile components, each having an opening therein adjacent a peripheral surface thereof, said first and second elements being engaged within the openings in said mobile components.

7. Structure in accordance with claim 1, in combination with a pair of planar mobile components, each having an opening therein adjacent a peripheral edge thereof, said first and second elements being engaged within the openings in said mobile components.

8. Structure in accordance with claim 1, in which said first enlargement is provided with a through opening, having an axis substantially perpendicular to the principal axis of said shaft.

* * * * *